US012452269B2

(12) United States Patent
Patronas et al.

(10) Patent No.: US 12,452,269 B2
(45) Date of Patent: Oct. 21, 2025

(54) MACHINE LEARNING (ML) BASED SYSTEMS FOR AIR GAPPING NETWORK PORTS

(71) Applicant: Mellanox Technologies, Ltd., Yokneam (IL)

(72) Inventors: Ioannis (Giannis) Patronas, Piraeus (GR); Tamar Viclizki Cohen, Herzliya (IL); Vadim Gechman, Kibbutz Hulda (IL); Dimitrios Syrivelis, Volos (GR); Paraskevas Bakopoulos, Ilion (GR); Nikolaos Argyris, Zografou (GR); Elad Mentovich, Tel Aviv (IL)

(73) Assignee: Mellanox Technologies, Ltd., Yokneam (IL)

( * ) Notice: Subject to any disclaimer, the term of this patent is extended or adjusted under 35 U.S.C. 154(b) by 260 days.

(21) Appl. No.: 17/956,208

(22) Filed: Sep. 29, 2022

(65) Prior Publication Data

US 2024/0098104 A1    Mar. 21, 2024

(30) Foreign Application Priority Data

Sep. 19, 2022    (GR) .............................. 2022/0100760

(51) Int. Cl.
*H04L 9/40*        (2022.01)
*H04L 41/16*       (2022.01)
*H04L 47/17*       (2022.01)

(52) U.S. Cl.
CPC .......... *H04L 63/1425* (2013.01); *H04L 41/16* (2013.01); *H04L 47/17* (2013.01)

(58) Field of Classification Search
CPC ..................... H04L 63/1425; H04L 47/17
See application file for complete search history.

(56) References Cited

U.S. PATENT DOCUMENTS

| 6,981,174 | B1  |   | 12/2005 | Hanning |              |
|-----------|-----|---|---------|---------|--------------|
| 9,306,965 | B1  | * | 4/2016  | Grossman| H04L 63/1425 |
| 11,310,206| B2  | * | 4/2022  | Reyes   | H04L 63/0236 |

(Continued)

FOREIGN PATENT DOCUMENTS

EP        1009192 A2    6/2000

OTHER PUBLICATIONS

"Credo Announces HiWire SWITCH AEC-Enabling Simpler Faster and More Reliable Dual TOR Connectivity", [online] Jul. 15, 2021. Retrieved from the internet https://financialpost.com/pmn/press-releases-pmn/business-wire-news-releases-pmn/credo-announces-hiwire-switch-aec-enabling-simpler-faster-and-more-reliable-dual-tor-connectivity.

(Continued)

*Primary Examiner* — Kristie D Shingles
(74) *Attorney, Agent, or Firm* — Anup Iyer; Moore & Van Allen PLLC (57) ABSTRACT

Systems, computer program products, and methods are described herein for machine learning (ML) based network resilience and steering. An example system monitors data traffic across one or more network ports and determines a first data traffic pattern from the data traffic. The system further determines, via a ML subsystem, that the first data traffic pattern is indicative of a security threat to a first network port. In response to determining that the first data traffic pattern is indicative of the security threat to the first network port, the system further isolates the first network port from the one or more network ports.

17 Claims, 3 Drawing Sheets

(56) References Cited

U.S. PATENT DOCUMENTS

| | | | | |
|---|---|---|---|---|
| 2012/0092985 | A1* | 4/2012 | Caird | H04L 41/0663 |
| | | | | 370/225 |
| 2014/0007238 | A1* | 1/2014 | Magee | G06F 21/577 |
| | | | | 726/24 |
| 2015/0304238 | A1 | 10/2015 | Brown | |
| 2016/0380880 | A1* | 12/2016 | Swinkels | H04L 49/65 |
| | | | | 370/389 |
| 2018/0048674 | A1* | 2/2018 | Black | H04W 12/041 |
| 2019/0114877 | A1 | 4/2019 | Hohman | |
| 2019/0165988 | A1 | 5/2019 | Wang et al. | |
| 2020/0389469 | A1* | 12/2020 | Litichever | H04L 63/145 |
| 2021/0044563 | A1* | 2/2021 | Reyes | G06F 21/564 |
| 2022/0030022 | A1* | 1/2022 | Keith, Jr. | H04L 9/0866 |
| 2022/0173980 | A1 | 6/2022 | Yoon | |
| 2022/0286436 | A1* | 9/2022 | Shah | H04L 63/0281 |
| 2023/0403296 | A1* | 12/2023 | Pickman | H04L 63/1458 |
| 2024/0089271 | A1* | 3/2024 | Yablokov | H04L 63/1416 |
| 2024/0314152 | A1* | 9/2024 | Mistry | H04L 63/1408 |

OTHER PUBLICATIONS

Mellette, W. et al., "P-FatTree: A Multi-channel Datacenter Network Topology", [online] HotNets 16: Proceedings of the 15th ACM Workshop on Hot Topics in Networks, Nov. 2016, pp. 78-84. Retrieved from the internet https://doi.org/10.1145/3005745.3005746.

Michelogiannakis, G. et al., "Bandwidth Steering in HPC Using Silicon Nanophotonics", [online] In Proceedings of the International Conference for High Performance Computing, Networking, Storage and Analysis, Nov. 17-22, 2019, Denver, CO., pp. 1-25. Retrieved from the internet https://doi.org/10.1145/3295500.3356145.

Minkenberg, C. et al., "Large-Scale System Partitioning using OCS," [online] 2015 International Conference on Photonics in Switching (PS), Florence, Italy, 2015, pp. 235-237. Retrieved from the internet doi: 10.1109/PS.2015.7329011.

Patronas, et al., pending U.S. Appl. No. 17/956,035, filed Sep. 29, 2022.

Patronas, et al., pending U.S. Appl. No. 17/964,367, filed Oct. 12, 2022.

Patronas, et al., pending U.S. Appl. No. 17/982,827, filed Nov. 8, 2022.

Patronas, et al., pending U.S. Appl. No. 17/982,895, filed Nov. 8, 2022.

Patronas, et al., pending U.S. Appl. No. 18/083,981, filed Dec. 19, 2022.

Dangi et al., pending U.S. Appl. No. 17/956,638, filed Sep. 29, 2022.

Clemons et al., pending U.S. Appl. No. 18/152,528, filed Jan. 10, 2023.

* cited by examiner

MACHINE LEARNING (ML) BASED SYSTEMS FOR AIR GAPPING NETWORK PORTS

CROSS-REFERENCE TO RELATED APPLICATIONS

This application claims priority to Greek Patent Application No. 2022/010,0760, filed Sep. 19, 2022, the entire contents of which application are hereby incorporated herein by reference.

TECHNOLOGICAL FIELD

Example embodiments of the present disclosure relate generally to network communications and, more particularly, to the threat-based identification of network ports for air gapping using machine learning techniques.

BACKGROUND

Network security refers to the protection of the underlying networking infrastructure, such as network ports (e.g., switches, optical modules, servers, hosts, etc.) from unauthorized access, misuse, or theft. Network security solutions may identify incidences of security threats impacting network ports and trigger responsive actions to mitigate the impact of the security threat on the network ports.

BRIEF SUMMARY

Systems, methods, and computer program products are provided for machine-learning based applications for air gapping network ports. In one aspect, a machine learning (ML) based system for air gapping network ports is provided. The system may include a non-transitory storage device and a processor coupled to the non-transitory storage device. The processor may monitor data traffic across one or more network ports and determine a first data traffic pattern from the data traffic. The processor may determine, via a ML subsystem, that the first data traffic pattern is indicative of a security threat to a first network port and isolates the first network port from the one or more network ports in response to determining that the first data traffic pattern is indicative of the security threat to the first network port.

In some embodiments, in determining that the first data traffic pattern is indicative of the security threat to the first network port, the processor may further deploy, via the ML subsystem, a trained ML model on the first data traffic pattern extracted from the data traffic and determine, via the trained ML model, a likelihood of the first security threat to the first network port. The processor may further determine that the first data traffic pattern is indicative of the security threat to the first network port in an instance in which the likelihood of the first security threat to the first network port satisfies a threat threshold.

In some embodiments, the processor may further monitor data traffic across the one or more network ports for a first time period after isolating the first network port from the one or more network ports and determine a second data traffic pattern from the data traffic monitored for the first time period. The processor may further determine, via the ML subsystem, that the second data traffic pattern is not indicative of the security threat to the first network port and reconnects the first network port to the one or more network ports in an instance in which the second data traffic pattern is not indicative of the security threat to the first network port.

In some embodiments, the processor may further determine that the first network port is associated with a first network port cluster and determine a redundant network port and an intermediate network switch associated with the first network port cluster. The processor may subsequently trigger the intermediate network switch to reroute the data traffic from the first network port to the redundant network port in response to determining that the first data traffic pattern is indicative of the security threat to the first network port.

In some embodiments, the processor may further receive one or more data traffic patterns and one or more security threats for the one or more network ports associated with the one or more data traffic patterns. The processor may further generate a feature set using the one or more data traffic patterns and the one or more security threats for the one or more network ports and trains, using the ML subsystem, an ML model using the feature set.

In some embodiments, the one or more data traffic patterns may be associated with data movement across the one or more network ports in an instance in which the one or more security threats occur.

In some embodiments, prior to monitoring the data traffic, the processor may supply a stimulus to the one or more network ports.

In yet another aspect, a computer program product for air gapping network ports using machine learning (ML) is provided. The computer program product may include a non-transitory computer-readable medium comprising code causing an apparatus to monitor data traffic across one or more network ports and determine a first data traffic pattern from the data traffic. The non-transitory computer-readable medium including code causing the apparatus to determine, via a ML subsystem, that the first data traffic pattern is indicative of a security threat to a first network port and isolate the first network port from the one or more network ports in response to determining that the first data traffic pattern is indicative of the security threat to the first network port.

In yet another aspect, a method for air gapping network ports using machine learning (ML) is provided. The method may include monitoring data traffic across one or more network ports and determining a first data traffic pattern from the data traffic. The method may further include determining, via a ML subsystem, that the first data traffic pattern is indicative of a security threat to a first network port and isolating the first network port from the one or more network ports in response to determining that the first data traffic pattern is indicative of the security threat to the first network port.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Overview

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, "operatively coupled" may mean that the components are electronically coupled and/or are in electrical communication with one another, or optically coupled and/or are in optical communication with one another. Furthermore, "operatively coupled" may mean that the components may be formed integrally with each other or may be formed separately and coupled together. Furthermore, "operatively coupled" may mean that the components may be directly connected to each other or may be connected to each other with one or more components (e.g., connectors) located between the components that are operatively coupled together. Furthermore, "operatively coupled" may mean that the components are detachable from each other or that they are permanently coupled together.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, satisfied, etc.

It should be understood that the word "exemplary" is used herein to mean "serving as an example, instance, or illustration." Any implementation described herein as "exemplary" is not necessarily to be construed as advantageous over other implementations.

As described herein, network ports forming a network port pair may be referred to with reference to "input" and "output" network ports such that each network port pair includes a respective input network port and output network port. As such, the terms "input" and "output" are used merely for illustrative purposes in that the data, signals, information, and/or the like, that is transmitted by the network port pair may travel in either direction. In other words, an example input network port may operate as an output network port, and an example output network port may operate as an input network port. The present disclosure, therefore, contemplates that the network ports described herein may operate to transmit data, signals, and information to and receive data, signals, and information from any device communicably coupled thereto regardless of reference to input or output.

Furthermore, as would be evident to one of ordinary skill in the art in light of the present disclosure, the terms "substantially" and "approximately" indicate that the referenced element or associated description is accurate to within applicable engineering tolerances.

The embodiments of the present disclosure are directed to machine learning based systems and associated methods for air gapping network ports. An example system may employ a machine learning model that is trained using various security threats and corresponding data traffic patterns (e.g., snapshots of data traffic across various network ports when the security threats occur). The trained machine learning model may then deployed on data traffic across various network nodes, ports, pods, etc. to determine whether a particular network port is likely to experience a security threat. To this end, the trained machine learning model may analyze the data traffic across the network ports for specific data traffic patterns that indicate that the particular network port is likely to experience the security threat. In response, the system may, physically or via severing network communication, isolate the network port that is likely to experience the security threat from the rest of the network ports preventing any harmful impact by the potentially infected port on the remainder of the network. In addition, the system may identify the port cluster, the intermediate network switch for the port cluster, and/or the redundant nodes in the port cluster for the network port that is likely to experience the security threat. In some embodiments, the system may subsequently trigger the intermediate network switch to re-route the data traffic from the network port to the redundant ports for continued operation so as to isolate the network port that is likely to experience a security threat.

Example Network Environments

Figure 1:
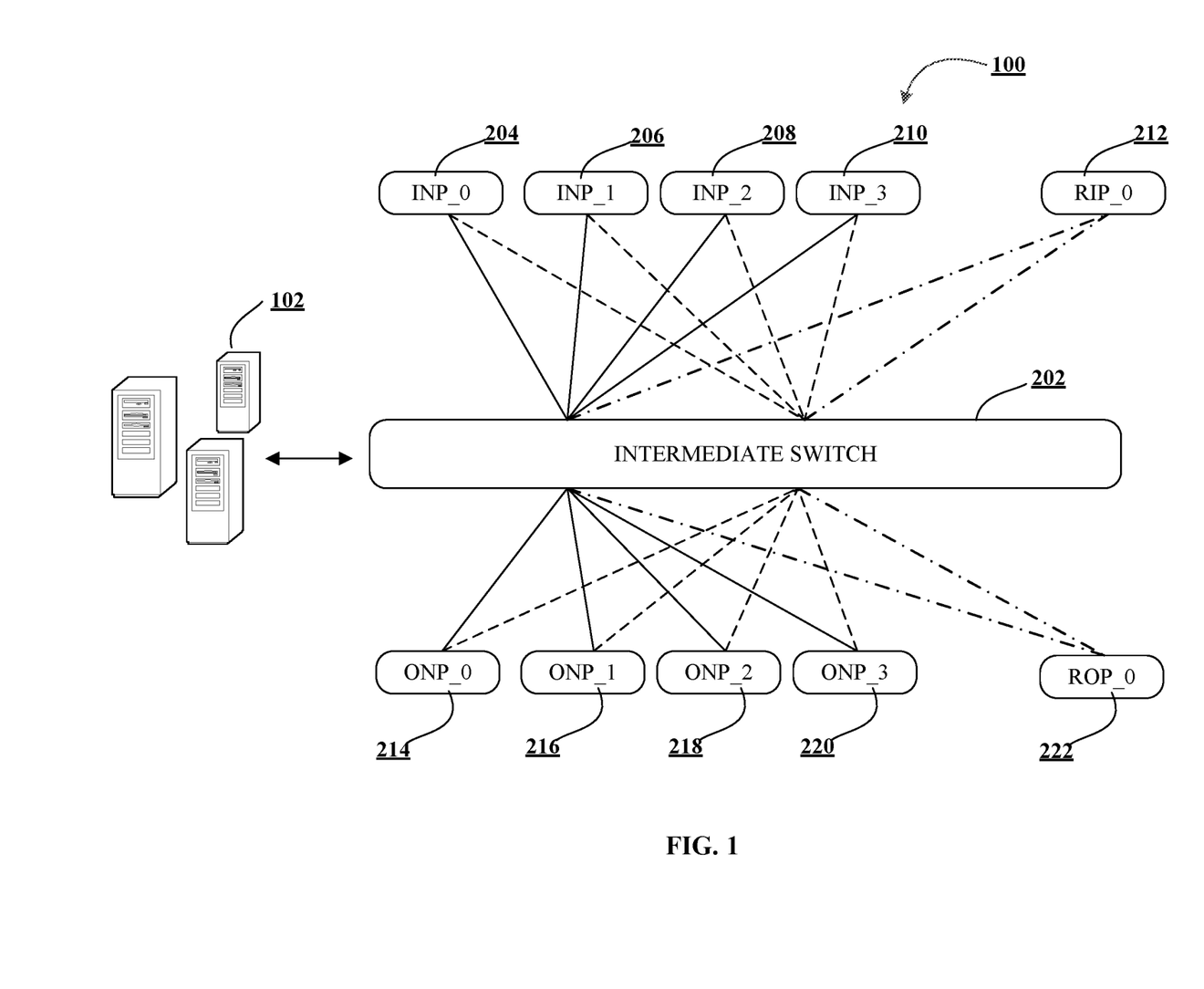
FIG. 1 illustrates an example network environment for a machine learning (ML) based system for air gapping network ports, in accordance with various embodiments of the present disclosure.

FIG. 1 illustrates an example network environment 100 for a machine learning (ML) based system for air gapping network ports. As shown in FIG. 1, the network environment 100 may include a system 102, an intermediate network switch 202, a plurality of input network ports 204, 206, 208, 210, a plurality of output network ports 214, 216, 218, 220, a redundant input network port 212, and a redundant output network port 222. It is to be understood that the structure of the network environment 100 and its components, connections and relationships, and their functions, are meant to be exemplary only, and are not meant to limit implementations of the embodiments described and/or claimed in this document. In one example, the network environment 100 may include more, fewer, or different components. In another example, some or all of the portions of the network environment 100 may be combined into a single portion or all of the portions of the network environment 100 may be separated into two or more distinct portions.

The system 102 may be implemented in a number of different forms. For example, the system 102 may be implemented as a standard server, or multiple times in a group of such servers. Additionally, the system 102 may also be implemented as part of a rack server system or a personal computer such as a laptop computer. Alternatively, components from the system 102 may be combined with one or more other same or similar systems and an entire system 102 may be made up of multiple computing devices communicating with each other. The system 102 may represent various forms of servers, such as web servers, database servers, file server, or the like, various forms of digital computing devices, such as laptops, desktops, workstations, or the like, or any other auxiliary network devices, Internet-of-things devices, electronic kiosk devices, mainframes, or the like, or any combination of the aforementioned. In some examples, the system 102 may include, in whole or in part, the intermediate switch and/or the intermediate switch 202 may include, in whole or in part, the system 102.

The plurality of input network ports 204, 206, 208, 210 and the plurality of output network ports 214, 216, 218, 220 may refer to any networking device by, with, and/or through which data, signal, information, and/or the like may be communicated. As such, the plurality of input network ports 204, 206, 208, 210 and the plurality of output network ports 214, 216, 218, 220 may include any networking component or device, such as a switch, a server, a network interface controller (NIC), a networking card, a host, and/or the like. Communication between the plurality of input network ports 204, 206, 208, 210 and the plurality of output network ports 214, 216, 218, 220 may be facilitated by an intermediate network switch 202. In some embodiments, the input network port and the output network port in each network port pair may be the same type of network port (e.g., all of the network ports are switches). Alternatively, the input network port may be different in structure or operation than the output network port (e.g., the input network port may be an electrical switch and the output network port may be server).

The intermediate network switch 202 may be a hardware device that is operatively coupled to the plurality of input network ports 204, 206, 208, 210 and the plurality of output network ports 214, 216, 218, 220, and configured to facilitate and route communication therebetween. More specifically, the intermediate network switch 202 may facilitate and route communication between network port pairs formed by the plurality of input network ports 204, 206, 208, 210 and the plurality of output network ports 214, 216, 218, 220. As shown in FIG. 1, these network port pairs may be INP_0 204 and ONP_0 214, INP_1 206 and ONP_1 216, INP_2 208 and ONP_2 218, and INP 3 210 and ONP_3 220. In some embodiments, the input network port (e.g., INP_0 204) and the output network port (e.g., ONP_0 214) of each network port pair (e.g., INP_0 and ONP_0) may be operatively coupled via the intermediate network switch 202 such that, when operational, the communications between the input network port and the output network port of the network port pair are directed via the intermediate network switch 202. In other embodiments, the input network port and the output network port may be operatively coupled separate from the intermediate network switch 202, and the intermediate network switch 202 may operate only to redirect communications in the event of the network port likely to experience a security threat, as described hereinafter. In some embodiments, the intermediate network switch 202 may be an optical switch configured to route communication between network ports. While the intermediate network switch 202 is shown as a singular intermediate network switch in FIG. 1, it is to be understood that various intermediate network switches may be used to operatively couple the plurality of input network ports 204, 206, 208, 210 and the plurality of output network ports 214, 216, 218, 220.

As shown in FIG. 1, the network environment 100 may include redundant input network port 212 and a redundant output network port 222 for continued operation in the event that any of the plurality of input network ports 204, 206, 208, 210 or the plurality of output network ports 214, 216, 218, 220 are likely to experience a security threat and require air gapping (e.g., physical or communication isolation). To this end, the redundant input network port 212 and the redundant output network port 222 may be operatively coupled to the intermediate network switch 202. The redundant input network port 212 may operate to provide resiliency for any of the plurality of input network ports 204, 206, 208, 210, and the redundant output network port 222 may operate to provide resiliency for any of the plurality of output network ports 214, 216, 218, 220. Although the network environment 100 is illustrated as having two independent redundant ports, one for the plurality of input network ports 204, 206, 208, 210, and another for the plurality of output network ports 214, 216, 218, 220, it is to be understood that a singular redundant network port (e.g., the redundant input network port 212 or the redundant output network port 222) may be leveraged by both the plurality of input network ports 204, 206, 208, 210, and the plurality of output network ports 214, 216, 218, 220.

The redundant network port (e.g., the redundant input network port 212 and/or the redundant output network port 222) may be inoperable, inactive, dormant, or otherwise not operatively coupled with an active/operable network port. In this way, for example, the redundant input network port 212 may provide a backup or alternative network port for any plurality of input network ports 204, 206, 208, 210 in communication with the intermediate network switch 202. For example, if input network port INP_0 202 is determined to likely experience a security threat and requires air gapping, the redundant input network port 212 may replace the input network port INP_0 202. In some embodiments, the number of redundant network ports may indicate the number of network ports that could be offline at a given time without network interruption. Similarly, for example, the redundant output network port 222 may provide a backup or alternative network port for any of the plurality of output network ports 214, 216, 218, 220 in communication with the intermediate network switch 202. For example, if the output network port ONP_0 212 is determined to likely experience a security threat and requires air gapping, the redundant output network port 222 may replace the output network port ONP_0 212. The redundant network ports described herein may, similar to the plurality of input network ports 204, 206, 208, 210, and the plurality of output network ports 214, 216, 218, 220, and may include any networking component or device, such as a switch, a server, a network interface controller (NIC), a networking card, a host, and/or the like.

In some embodiments, the intermediate network switch 202, the plurality of input network ports 204, 206, 208, 210, the plurality of output network ports 214, 216, 218, 220, the redundant input network port 212, and the redundant output network port 222 may be part of a leaf-spine network architecture. A leaf-spine architecture is a data center network topology that may include two switching layers—a spine layer and a leaf layer. The leaf layer may include access switches (leaf switches) that aggregate traffic from servers and connect directly into the spine or network core. Spine switches interconnect all leaf switches in a full-mesh topology between access switches in the leaf layer and the servers from which the access switches aggregate traffic. As such, in one embodiment, the plurality of input network ports 204, 206, 208, 210 and the redundant input network port 212 may be spine switches and the plurality of output network ports 214, 216, 218, 220 and the redundant input network port 212, and the redundant output network port 222 may be leaf switches.

Although described herein with reference to isolating network ports that are likely to experience a security threat via redundant network ports, the present disclosure contemplates that any mechanism for isolating a network port may be employed. Furthermore, in some embodiments, the network environment 100 may operate in the absence of redundant network ports 212, 222. For example, the intermediate switch 202 and/or system 102 may determine that a particular network port is likely to be subjected to a security threat and may, in response, physically isolate or air gap this network port by physically severing communication to and from this network port. Additionally or alternatively, the embodiments described herein may electronically divert network communication from this network port, such as by selectively rerouting communications to other, active network ports in the network environment. Said differently, the present disclosure contemplates that the embodiments described herein may isolate or otherwise prevent a negative impact by a particular network port on the remainder of the network environment 100 by any signal isolation technique or mechanism without limitation.

Example System Circuitry

Figure 2:
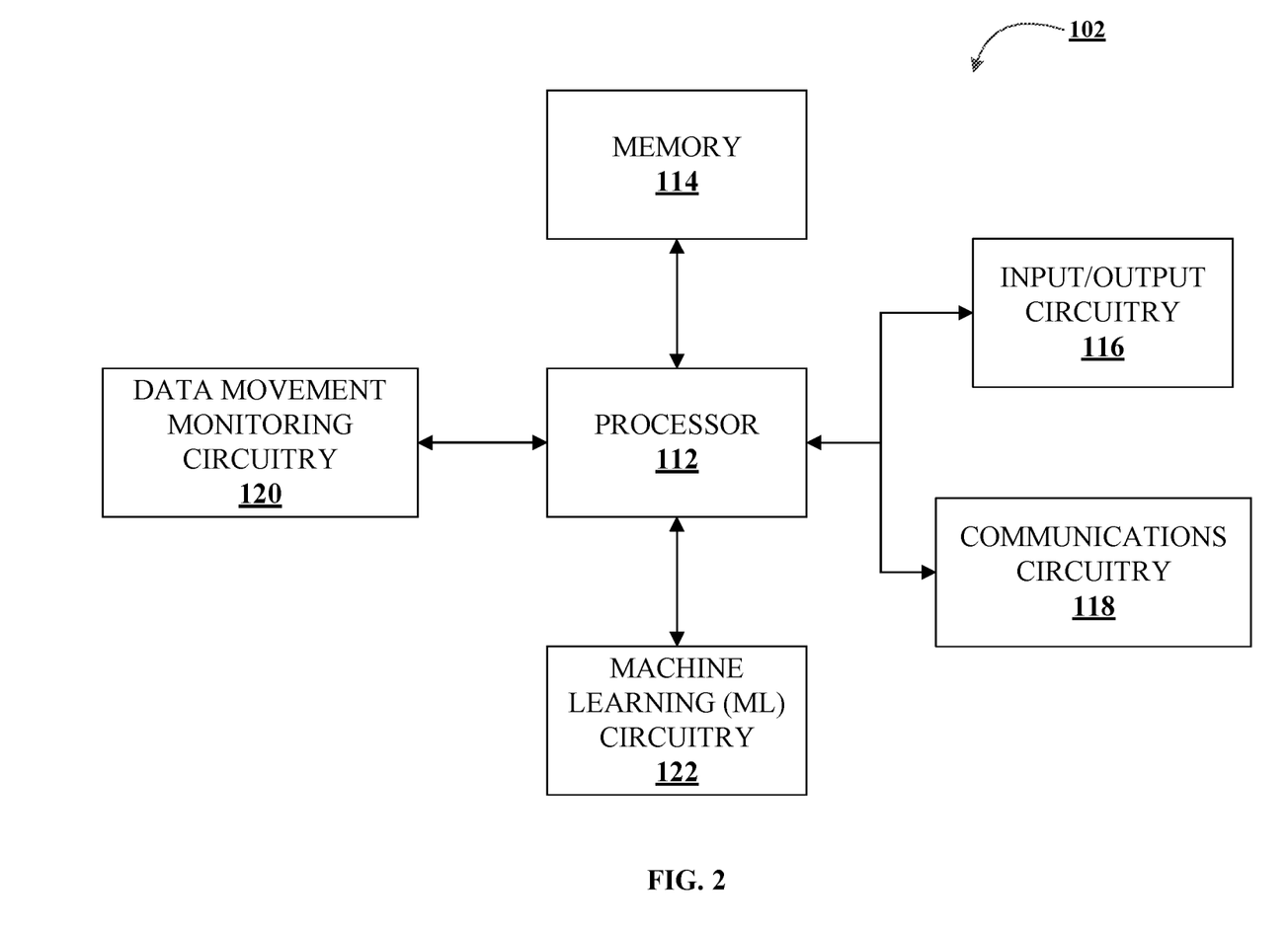
FIG. 2 illustrates an example block diagram of a system for use with various embodiments of the present disclosure.

FIG. 2 illustrates a schematic block diagram of example circuitry, some, or all of which may be included in the system 102. As shown in FIG. 2, the system 102 may include a processor 112, a memory 114, input/output circuitry 116, communications circuitry 118, data movement monitoring circuitry 120, and machine learning (ML) circuitry 122.

Although the term "circuitry" as used herein with respect to components 112-122 is described in some cases using functional language, it should be understood that the particular implementations necessarily include the use of particular hardware configured to perform the functions associated with the respective circuitry as described herein. It should also be understood that certain of these components 112-122 may include similar or common hardware. For example, two sets of circuitries may both leverage use of the same processor, network interface, storage medium, or the like to perform their associated functions, such that duplicate hardware is not required for each set of circuitries. It will be understood in this regard that some of the components described in connection with the system 102 may be housed within this device, while other components are housed within other devices (e.g., a controller in communication with the system 102).

While the term "circuitry" should be understood broadly to include hardware, in some embodiments, the term "circuitry" may also include software for configuring the hardware. For example, in some embodiments, "circuitry" may include processing circuitry, storage media, network interfaces, input/output devices, and the like. In some embodiments, other elements of the switch 102 may provide or supplement the functionality of particular circuitry. For example, the processor 112 may provide processing functionality, the memory 114 may provide storage functionality, the communications circuitry 118 may provide network interface functionality, and the like.

In some embodiments, the processor 112 (and/or co-processor or any other processing circuitry assisting or otherwise associated with the processor) may be in communication with the memory 114 via a bus for passing information among components of, for example, the system 102. The memory 114 may be non-transitory and may include, for example, one or more volatile and/or non-volatile memories, or some combination thereof. In other words, for example, the memory 114 may be an electronic storage device (e.g., a non-transitory computer readable storage medium). The memory 114 may be configured to store information, data, content, applications, instructions, or the like, for enabling an apparatus, e.g., system 102, to carry out various functions in accordance with example embodiments of the present disclosure.

Although illustrated in FIG. 2 as a single memory, the memory 114 may comprise a plurality of memory components. The plurality of memory components may be embodied on a single computing device or distributed across a plurality of computing devices. In various embodiments, the memory 114 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 114 may be configured to store information, data, applications, instructions, or the like for enabling the system 102 to carry out various functions in accordance with example embodiments discussed herein. For example, in at least some embodiments, the memory 114 is configured to buffer data for processing by the processor 112. Additionally, or alternatively, in at least some embodiments, the memory 114 is configured to store program instructions for execution by the processor 112. The memory 114 may store information in the form of static and/or dynamic information. This stored information may be stored and/or used by the system 102 during the course of performing its functionalities.

The processor 112 may be embodied in a number of different ways and may, for example, include one or more processing devices configured to perform independently. Additionally, or alternatively, the processor 112 may include one or more processors configured in tandem via a bus to enable independent execution of instructions, pipelining, and/or multithreading. The processor 112 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 2 as a single processor, in some embodiments, the processor 112 may include a plurality of processors. The plurality of processors may be embodied on a single computing device or may be distributed across a plurality of such devices collectively configured to function as the system 102. The plurality of processors may be in operative communication with each other and may be collectively configured to perform one or more functionalities of the system 102 as described herein.

In an example embodiment, the processor 112 is configured to execute instructions stored in the memory 114 or otherwise accessible to the processor 112. Alternatively, or additionally, the processor 112 may be configured to execute hard-coded functionality. As such, whether configured by hardware or software methods, or by a combination thereof, the processor 112 may represent an entity (e.g., physically embodied in circuitry) capable of performing operations according to an embodiment of the present disclosure while configured accordingly. Alternatively, as another example, when the processor 112 is embodied as an executor of software instructions, the instructions may specifically configure processor 112 to perform one or more algorithms and/or operations described herein when the instructions are executed. For example, these instructions, when executed by processor 112, may cause the system 102 to perform one or more of the functionalities thereof as described herein.

In some embodiments, the system 102 further includes input/output circuitry 116 that may, in turn, be in communication with the processor 112 to provide an audible, visual, mechanical, or other output and/or, in some embodiments, to receive an indication of an input from a user or another source. In that sense, the input/output circuitry 116 may include means for performing analog-to-digital and/or digital-to-analog data conversions. The input/output circuitry 116 may include support, for example, for a display, touchscreen, keyboard, mouse, image capturing device (e.g., a camera), microphone, and/or other input/output mechanisms. Input/output circuitry 116 may include a user interface and may include a web user interface, a mobile application, a kiosk, or the like. The input/output circuitry 116 may be used by a user to view and/or adjust the likelihood of a network port experiencing a security threat.

The processor 112 and/or user interface circuitry comprising the processor 112 may be configured to control one or more functions of a display or one or more user interface elements through computer-program instructions (e.g., software and/or firmware) stored on a memory accessible to the processor 112 (e.g., the memory 114, and/or the like). In some embodiments, aspects of input/output circuitry 116 may be reduced as compared to embodiments where the system 102 may be implemented as an end-user machine or other type of device designed for complex user interactions. In some embodiments (like other components discussed herein), the input/output circuitry 116 may be eliminated from the system 102. The input/output circuitry 116 may be in communication with memory 114, communications circuitry 118, and/or any other component(s), such as via a bus. Although more than one input/output circuitry and/or other component can be included in the system 102, only one is shown in FIG. 2 to avoid overcomplicating the disclosure (e.g., as with the other components discussed herein).

The communications circuitry 118, in some embodiments, includes any means, such as a device or circuitry embodied in either hardware, software, firmware or a combination of hardware, software, and/or firmware, that is configured to receive and/or transmit data from/to a network and/or any other device, circuitry, or module in communication with the intermediate network switch. In this regard, the communications circuitry 118 may include, for example, a network interface for enabling communications with a wired or wireless communication network. For example, in some embodiments, communications circuitry 118 may be configured to receive and/or transmit any data that may be stored by the memory 114 using any protocol that may be used for communications between computing devices. For example, the communications circuitry 118 may include one or more network interface cards, antennae, transmitters, receivers, buses, switches, routers, modems, and supporting hardware and/or software, and/or firmware/software, or any other device suitable for enabling communications via a network. Additionally, or alternatively, in some embodiments, the communications circuitry 118 may include circuitry for interacting with the antenna(s) to cause transmission of signals via the antenna(e) or to handle receipt of signals received via the antenna(e). These signals may be transmitted by the system 102 using any of a number of wireless personal area network (PAN) technologies, such as Bluetooth® v1.0 through v5.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. The communications circuitry 118 may additionally or alternatively be in communication with the memory 114, the input/output circuitry 116, and/or any other component of system 102, such as via a bus. The communication circuitry 118 of the system 102 may also be configured to receive and transmit information with the various network ports discussed herein.

The data movement monitoring circuitry 120, in some embodiments, captures and analyzes network traffic, including any data movement across the plurality of input network ports 204, 206, 208, 210 and the plurality of output network ports 214, 216, 218, 220. To this end, the data movement monitoring circuitry 120, for example, may capture data movement between the plurality of input network ports 204, 206, 208, 210 and the intermediate network switch 202, and between the intermediate network switch 202 and the plurality of output network ports 214, 216, 218, 220. The captured data movement is then used to identify traffic data patterns of interest. The ML circuitry 122, in some embodiments, may use the traffic data patterns of interest to determine whether any of the identified traffic data patterns are indicative of a security threat to a network port.

In some embodiments, the system 102 includes hardware, software, firmware, and/or a combination of such components, configured to support various aspects of data movement monitoring and machine learning implementations as described herein. It should be appreciated that in some embodiments, the data movement monitoring circuitry 120 and the ML circuitry 122 may perform one or more of such exemplary actions in combination with another circuitry of the system 102, such as the memory 114, processor 112, input/output circuitry 116, and communications circuitry 118. For example, in some embodiments, the data movement monitoring circuitry 120 and/or the ML circuitry 122 utilizes processing circuitry, such as the processor 112 and/or the like, to form a self-contained subsystem to perform one or more of its corresponding operations. In a further example, and in some embodiments, some or all of the functionality of the data movement monitoring circuitry 120 and/or the ML circuitry 122 may be performed by processor 112. In this regard, some or all of the example processes and algorithms discussed herein can be performed by at least one processor 112, the data movement monitoring circuitry 120, and/or the ML circuitry 122. It should also be appreciated that, in some embodiments, the data movement monitoring circuitry 120, and/or the ML circuitry 122 may include a separate processor, specially configured field programmable gate array (FPGA), or application specific interface circuit (ASIC) to perform its corresponding functions.

Additionally, or alternatively, in some embodiments, the data movement monitoring circuitry 120, and/or the ML circuitry 122 use the memory 114 to store collected information. For example, in some implementations, the data movement monitoring circuitry 120, and/or the ML circuitry 122 includes hardware, software, firmware, and/or a combination thereof, that interacts with the memory 114 to send, retrieve, update, and/or store data.

Accordingly, non-transitory computer readable storage media can be configured to store firmware, one or more application programs, and/or other software, which include instructions and/or other computer-readable program code portions that can be executed to direct operation of the system 102 to implement various operations, including the examples shown herein. As such, a series of computer-readable program code portions may be embodied in one or more computer-program products and can be used, with a device, system 102, database, and/or other programmable apparatus, to produce the machine-implemented processes discussed herein. It is also noted that all or some of the information discussed herein can be based on data that is received, generated and/or maintained by one or more components of the system 102. In some embodiments, one or more external systems (such as a remote cloud computing and/or data storage system) may also be leveraged to provide at least some of the functionality discussed herein.

Example ML Methods for Air Gapping Network Ports

Figure 3:
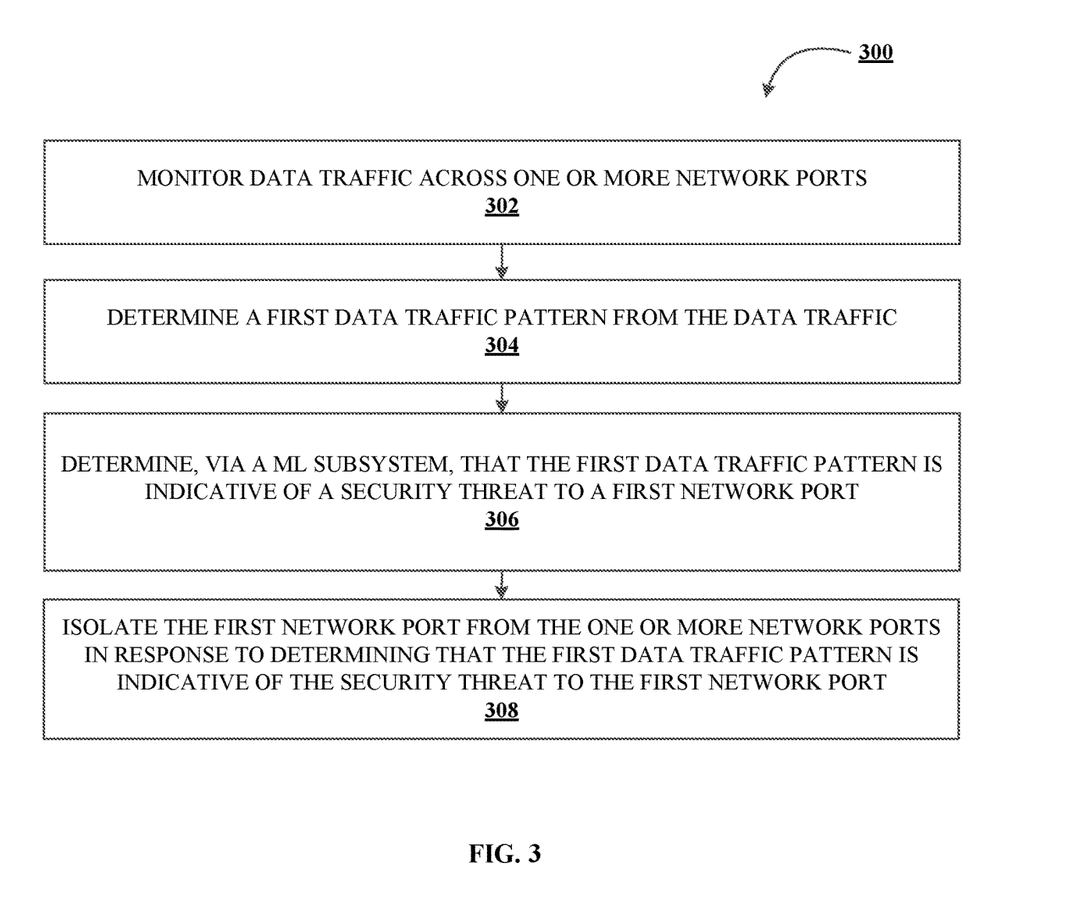
FIG. 3 illustrates an example machine learning (ML) based method for air gapping network ports, in accordance with various embodiments of the present disclosure.

FIG. 3 illustrates an example machine learning (ML) method for air gapping network ports 300. As shown in block 302, the methods includes monitoring data traffic across one or more network ports. In some embodiments, monitoring data traffic may include collecting, storing, and analyzing network traffic across the network environment in real-time or near real-time. To this end, in addition to network ports, the system may monitor data traffic using information from featuring applications, employed protocols, communication endpoints, traffic direction, traffic volume, and/or the like. Monitoring data traffic provides valuable insight into network uptime and availability, visibility into various network components (e.g., network ports), network performance, capacity planning, network security, and/or the like.

In some embodiments, prior to monitoring the data traffic, the system may supply a stimulus to the network ports in the network environment to determine a network response to the stimulus as part of a network performance test. The type of stimulus applied to the network ports may depend on the type of the network performance test. Example network performance tests may include vulnerability testing, penetration testing, specific network tests such as wireless network penetration testing, application security testing, peak load testing, and/or the like. As such, the type of the network performance test may determine the type of stimulus that is to be applied to the network environment.

Next, as shown in block 304, the method may include determining a first data traffic pattern from the data traffic. Traffic pattern analysis may be used to analyze the state of the network environment at a particular point time to detect advanced persistent threats, abnormal or excessive communication patterns, various malware activities, and/or the like. In some embodiments, as part of determining the first data traffic pattern, the system may generate a number of data traffic patterns that reflect expected network behavior for a network environment to establish a behavior baseline. In one aspect, the expected network behavior may be subject to a preset tolerance. If the data traffic pattern reflects network behavior within the preset tolerance, then the network is determined to behave in an expected manner. Alternatively, if the data traffic pattern reflects network behavior outside the preset tolerance, then the network is determined to behave in an abnormal manner and is flagged for further analysis. In some embodiments, further analysis of abnormal network behavior may include investigating the data traffic pattern (e.g., first data traffic pattern) to identify potential security threats affecting specific network ports in the network environment.

Next, as shown in block 306, the method may include determining, via a ML subsystem, that the first data traffic pattern is indicative of a security threat to a first network port. To this end, in some embodiments, the system may deploy, via the ML subsystem, a trained ML model on the first data traffic pattern. A trained ML model may refer to a mathematical model generated by machine learning algorithms based on training data to make predictions or decisions without being explicitly programmed to do so. To train the ML model, the system may use various data traffic patterns that reflect abnormal network behavior. These data traffic patterns are known to be associated with security threats to specific network ports. Thus, the data traffic patterns, and the associated security threats are used as training data to train the ML model.

The ML model represents what was learned by the selected machine learning algorithm and represents the rules, numbers, and any other algorithm-specific data structures required for decision-making. Selecting the right machine learning algorithm may depend on a number of different factors, such as the problem statement and the kind of output needed, the type and size of the data, the available computational time, number of features and observations in the data, and/or the like. ML algorithms may refer to programs that are configured to self-adjust and perform better as they are exposed to more data. To this extent, ML algorithms are capable of adjusting their own parameters, given feedback on previous performance in making predictions about a dataset.

The ML algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

The ML model may be trained using repeated execution cycles of experimentation, testing, and tuning to modify the performance of the ML algorithm and refine the results in preparation for deployment of those results for consumption or decision making. The ML model may be tuned by dynamically varying hyperparameters in each iteration (e.g., number of trees in a tree-based algorithm or the value of alpha in a linear algorithm), running the algorithm on the data again, and then comparing its performance on a validation set to determine which set of hyperparameters results in the most accurate model. The accuracy of the model may be the measurement used to determine which set of hyperparameters is best at identifying relationships and patterns between variables in a dataset based on the input, or training data. A fully trained ML model is one whose hyperparameters are tuned and model accuracy maximized.

When deployed, the trained ML model may be used to determine whether the first data traffic pattern is indicative of a security threat to a first network port. To this end, the system may determine, via the trained ML model, a likelihood of the first security threat to the first network port. The likelihood of the first security threat is then compared to a threat threshold to determine whether the first data traffic pattern is indicative of a security threat to a first network port. In this regard, if the likelihood of the first security threat satisfies the threat threshold, the system may determine that the first data traffic pattern is indicative of the security threat. On the other hand, if the likelihood of the first security threat fails to satisfy the threat threshold, the system may determine that the first data traffic pattern is not indicative of the security threat.

Although described herein with reference to determining the likelihood of a security threat via analysis of data traffic patterns associated with the network, particular network ports, etc., the present disclosure contemplates that this determination may consider any feature, characteristic, parameter, etc. associated with the network ports. By way of example, in some embodiments, the intermediate network switch, the system, etc. may detect malicious activity associated with a particular network port that is independent of the data traffic pattern associated with this network port (e.g., a malicious application associated with the network port). As described hereafter with reference to block 308, the system may isolate (e.g., air gap) such a network port due to the malicious activity associated with the network port in addition to or as an alternative to the data traffic pattern associated with the particular network port.

Furthermore, although described herein with reference to the use of trained ML models to detect an indication of a security threat to the network ports (e.g., the first network port or otherwise), the present disclosure contemplates that other techniques may be used in addition to or as an alternative to the ML based techniques described herein. By way of nonlimiting example, the system, intermediate network switch, etc. may receive an indication of a security threat to a particular network port in response to a user input of such a potential security threat, a change in one or more operating parameters or characteristics associated with the network port, a detection of a malicious application running on the particular network port, and/or the like. In other words, the embodiments described herein may leverage security threat detection techniques and mechanisms that are separate from the ML techniques described herein based upon the intended application of the system.

Next, as shown in block 308, the method may include isolating the first network port from the one or more network ports in response to determining that the first data traffic pattern is indicative of the security threat to the first network port. Isolating the first network port not only reduces the impact of the security threat to the first network port, but also reduces the likelihood of the security threat propagating to other network ports connected to the first network port in the network environment. In some embodiments, isolating the first network port may include air gapping the first network port, whereby all communication links (wired or wireless) to the first network port are terminated. In other words, air gapping the first network port ensures that the first network port is no longer able to communicate with any of the other network ports in the network environment or any other network environment.

In some embodiments, isolating a network port (e.g., first network port) from the rest of the network environment may result in degradation of network performance or disruption in network connectivity. To provide resiliency and minimize the impact of network performance degradation and/or disruption, the system may reroute a portion of the network traffic from the first network port to a redundant network port until the security threat to the first network port is addressed. To this end, in some embodiments, the system may determine that the first network port is associated with a first network port cluster. A network environment may include one or more network port clusters, with each network port cluster having a plurality of network input ports (e.g., plurality of input network ports 204, 206, 208, 210), network output ports (e.g., plurality of output network ports 214, 216, 218, 220), intermediate network switches (e.g., intermediate network switch 202), and redundant network ports (e.g., a redundant input network port 212 and a redundant output network port 222). By identifying the network port cluster (e.g., first network port cluster) associated with the network port (e.g., first network port), the system may identify the intermediate network switch associated with the network port. As described herein, each intermediate network switch may include redundant network ports that may remain offline, dormant, or otherwise inoperable.

In response to identifying the intermediate network switch, the system may reroute a portion of network traffic from the first network port to the redundant network port in response to determining that the first data traffic pattern is indicative of the security threat to the first network port. As described herein, a redundant input network port (e.g., redundant input network port 212) may operate to provide resiliency for an input network port (e.g., any of the plurality of input network ports 204, 206, 208, 210), and the redundant output network port (e.g., redundant output network port 222) may operate to provide resiliency for an output network port (e.g., any of the plurality of output network ports 214, 216, 218, 220). Also, as described herein, a singular redundant network port (e.g., the redundant input network port 212 or the redundant output network port 222) may be leveraged by both the plurality of input network ports 204, 206, 208, 210, and the plurality of output network ports 214, 216, 218, 220 for resiliency.

Rerouting the portion of the network traffic from the first network port to the redundant network port allows for the security threat to the first network port to be addressed. In this regard, the system may trigger the intermediate network switch to terminate a communication link to the first network port and establish a communication link to the redundant network port. Once the security threat to the first network port has been addressed, the first network port may be re-introduced into the network environment. To this end, the system may monitor data traffic across the network ports for a particular time period (e.g., first time period) after triggering the rerouting of the portion of network traffic from the first network port to the redundant network port. During this time, the system may determine, using the trained ML model, that the data traffic pattern (e.g., second data traffic pattern) is no longer indicative of a security threat to the first network port. In response, the system may reconnect the first network port to the network environment and trigger the intermediate network switch to reroute the portion of network traffic from the redundant network port back to the first network port.

Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A machine learning (ML) based system for air gapping network ports, the system comprising:
 a non-transitory storage device; and
 a processor coupled to the non-transitory storage device, wherein the processor is to:
  monitor data traffic across network ports in a network environment;
  determine a first data traffic pattern from the data traffic;
  determine, via a ML subsystem, that the first data traffic pattern is indicative of a security threat to a first network port; and
  in response to determining that the first data traffic pattern is indicative of the security threat to the first network port, (i) isolate the first network port from the network ports, and (ii) trigger an intermediate network switch to reroute the data traffic from the first network port to a redundant network port,
  wherein the first network port, the redundant network port, and the intermediate network switch are associated with a first network port cluster.

2. The system of claim 1, wherein, in determining that the first data traffic pattern is indicative of the security threat to the first network port, the processor is to:
 deploy, via the ML subsystem, a trained ML model on the first data traffic pattern extracted from the data traffic;
 determine, via the trained ML model, a likelihood of the first security threat to the first network port; and
 determine that the first data traffic pattern is indicative of the security threat to the first network port in an instance in which the likelihood of the first security threat to the first network port satisfies a threat threshold.

3. The system of claim 1, wherein the processor is to:
 monitor data traffic across the network ports for a first time period after isolating the first network port from the network ports;
 determine a second data traffic pattern from the data traffic monitored for the first time period;
 determine, via the ML subsystem, that the second data traffic pattern is not indicative of the security threat to the first network port; and
 reconnect the first network port to the network ports in an instance in which the second data traffic pattern is not indicative of the security threat to the first network port.

4. The system of claim 1, wherein the processor is to:
 receive one or more data traffic patterns and one or more security threats for the network ports associated with the one or more data traffic patterns;
 generate a feature set using the one or more data traffic patterns and the one or more security threats for the network ports; and
 train, using the ML subsystem, an ML model using the feature set.

5. The system of claim 4, wherein the one or more data traffic patterns are associated with data movement across the network ports in an instance in which the one or more security threats occur.

6. The system of claim 1, wherein, prior to monitoring the data traffic, the processor is to supply a stimulus to the network ports.

7. A computer program product for air gapping network ports using machine learning (ML), the computer program product comprising a non-transitory computer-readable medium comprising code causing an apparatus to:
 monitor data traffic across network ports in a network environment;
 determine a first data traffic pattern from the data traffic;
 determine, via a ML subsystem, that the first data traffic pattern is indicative of a security threat to a first network port; and
 in response to determining that the first data traffic pattern is indicative of the security threat to the first network port, (i) isolate the first network port from the network ports, and (ii) trigger an intermediate network switch to reroute the data traffic from the first network port to a redundant network port,
 wherein the first network port, the redundant network port, and the intermediate network switch are associated with a first network port cluster.

8. The computer program product of claim 7, wherein, in determining that the first data traffic pattern is indicative of the security threat to the first network port, the apparatus is to:
- deploy, via the ML subsystem, a trained ML model on the first data traffic pattern extracted from the data traffic;
- determine, via the trained ML model, a likelihood of the first security threat to the first network port; and
- determine that the first data traffic pattern is indicative of the security threat to the first network port in an instance in which the likelihood of the first security threat to the first network port satisfies a failure threshold.

9. The computer program product of claim 7, wherein the apparatus is to:
- monitor data traffic across the network ports for a first time period after isolating the first network port from the one or more network ports;
- determine a second data traffic pattern from the data traffic monitored for the first time period;
- determine, via the ML subsystem, that the second data traffic pattern is not indicative of the security threat to the first network port; and
- reconnect the first network port to the network ports in an instance in which the second data traffic pattern is not indicative of the security threat to the first network port.

10. The computer program product of claim 7, wherein the apparatus is to:
- receive one or more data traffic patterns and one or more security threats for the network ports associated with the one or more data traffic patterns;
- generate a feature set using the one or more data traffic patterns and the one or more security threats for the network ports; and
- train, using the ML subsystem, an ML model using the feature set.

11. The computer program product of claim 10, wherein the one or more data traffic patterns are associated with data movement across the network ports in an instance in which the one or more security threats occur.

12. The computer program product of claim 7, wherein, prior to monitoring the data traffic, the apparatus is to supply a stimulus to the network ports.

13. A method for air gapping network ports using machine learning (ML), the method comprising:
- monitoring data traffic across network ports in a network environment;
- determining a first data traffic pattern from the data traffic;
- determining, via a ML subsystem, that the first data traffic pattern is indicative of a security threat to a first network port; and
- in response to determining that the first data traffic pattern is indicative of the security threat to the first network port, (i) isolate the first network port from the network ports, and (ii) trigger an intermediate network switch to reroute the data traffic from the first network port to a redundant network port,
- wherein the first network port, the redundant network port, and the intermediate network switch are associated with a first network port cluster.

14. The method of claim 13, wherein determining that the first data traffic pattern is indicative of the security threat to the first network port further comprises:
- deploying, via the ML subsystem, a trained ML model on the first data traffic pattern extracted from the data traffic;
- determining, via the trained ML model, a likelihood of the first security threat to the first network port; and
- determining that the first data traffic pattern is indicative of the security threat to the first network port in an instance in which the likelihood of the first security threat to the first network port satisfies a threat threshold.

15. The method of claim 13, further comprising:
- monitoring data traffic across the network ports for a first time period after isolating the first network port from the network ports;
- determining a second data traffic pattern from the data traffic monitored for the first time period;
- determining, via the ML subsystem, that the second data traffic pattern is not indicative of the security threat to the first network port; and
- reconnecting the first network port to the network ports in an instance in which the second data traffic pattern is not indicative of the security threat to the first network port.

16. The method of claim 13, further comprising:
- receiving one or more data traffic patterns and one or more security threats for the network ports associated with the one or more data traffic patterns;
- generating a feature set using the one or more data traffic patterns and the one or more security threats for the network ports; and
- training, using the ML subsystem, an ML model using the feature set.

17. The method of claim 16, wherein the one or more data traffic patterns are associated with data movement across the network ports in an instance in which the one or more security threats occur.

* * * * *